May 31, 1932.  A. D. MacLEAN  1,860,468
REGULATING VALVE
Filed June 8, 1927  2 Sheets-Sheet 1

Inventor
Allen D. MacLean
By William A. Strauch
Attorney

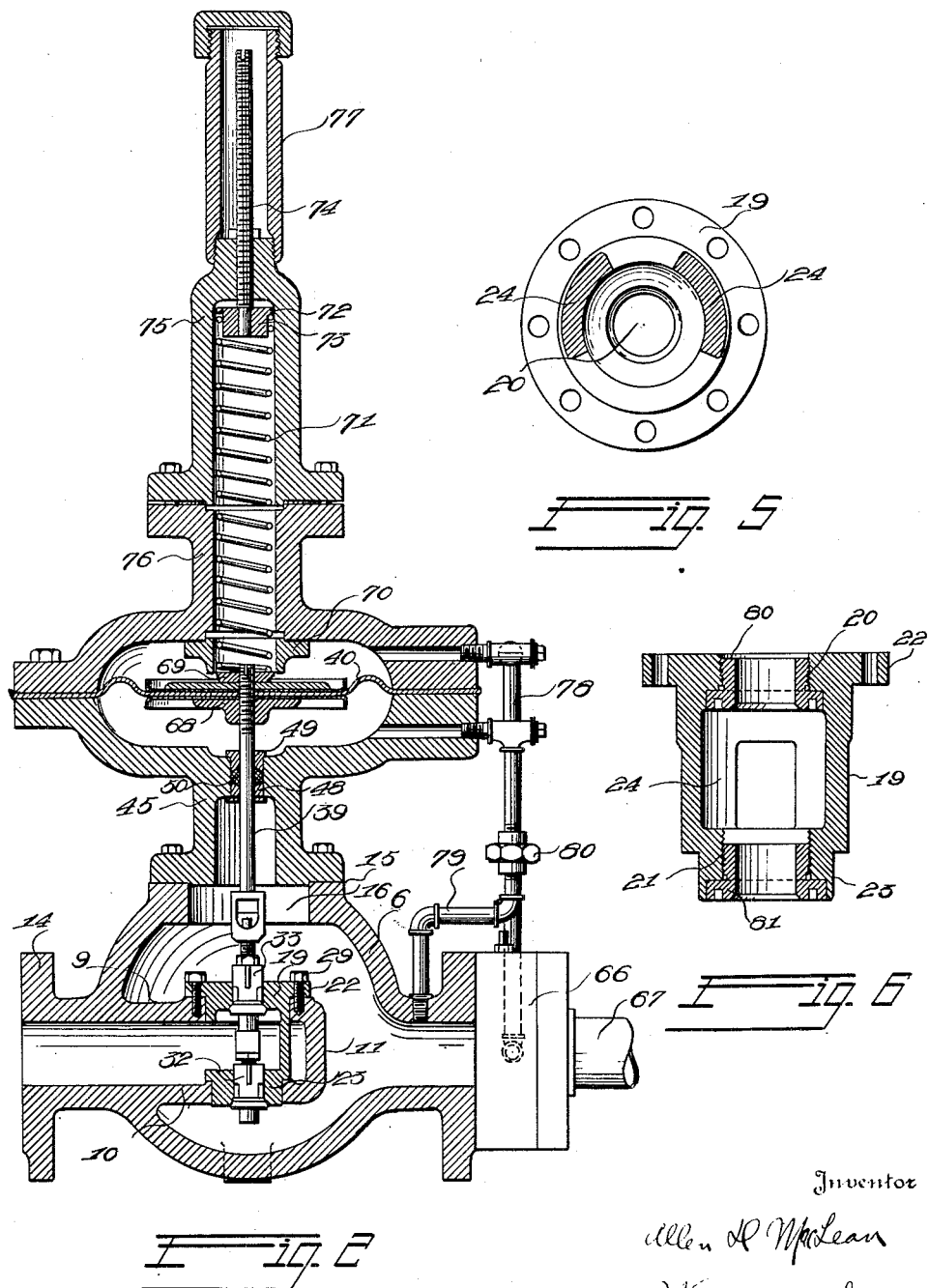

Patented May 31, 1932

1,860,468

UNITED STATES PATENT OFFICE

ALLEN D. MacLEAN, OF PITTSBURGH, PENNSYLVANIA, ASSIGNOR TO PITTSBURGH EQUITABLE METER COMPANY, OF PITTSBURGH, PENNSYLVANIA

REGULATING VALVE

Application filed June 8, 1927. Serial No. 197,386.

This invention relates to an automatically operating valve of the type that is used to regulate the flow of fluids in conduits subject to conditions that tend to normally produce an irregular rate of flow.

In valves of this type, especially those designed for use with steam or gaseous fluids subjected to considerable pressure, it is found in practice that quite frequent attention must be given to the valve parts in order that they may operate correctly and maintain fluid tight joints between the cooperating valve parts. In valves heretofore proposed it was necessary to disconnect a comparatively complicated valve from the conduit to which it was secured to make the repairs necessary to maintain proper operating conditions. This was done at considerable expense and inconvenience and required a shutting down of the fluid flow for comparatively long periods of time. To obviate this objection it has been before proposed to provide a regulator valve in which the essential parts of the valve could be removed without removing the valve from the conduit it controls. But such constructions have been unnecessarily complicated, expensive to produce and difficult to assemble and disassemble.

The primary object of this invention is to provide a regulator valve that can be cheaply constructed because it is of a very simple character.

A further object of the invention is to produce a valve that may be repaired with a minimum of expenditure of time and without disconnecting the valve from the conduit between the ends of which it is ordinarily arranged.

A further object of the invention is to provide a valve in the valve seats, which are removable as a unit through the same opening in the valve body through which the valves themselves are removable, so that it is only necessary to remove the valve head to service the valve parts.

A further object is to provide a unitary valve cage, including a plurality of valve seats, that is secured to the body by fastening elements positioned and adjusted in a direction parallel to the direction in which the cage is applied to the body.

Further objects will appear as a description of the invention proceeds with reference to the accompanying drawings in which,—

Figure 2 is a vertical sectional view of a modified form of my invention.

Figure 5 is a transverse section through the webs that connect the valve seats.

Figure 6 is a view showing a modified form of valve cage.

Similar reference characters indicate like parts throughout the several views.

Figure 1:
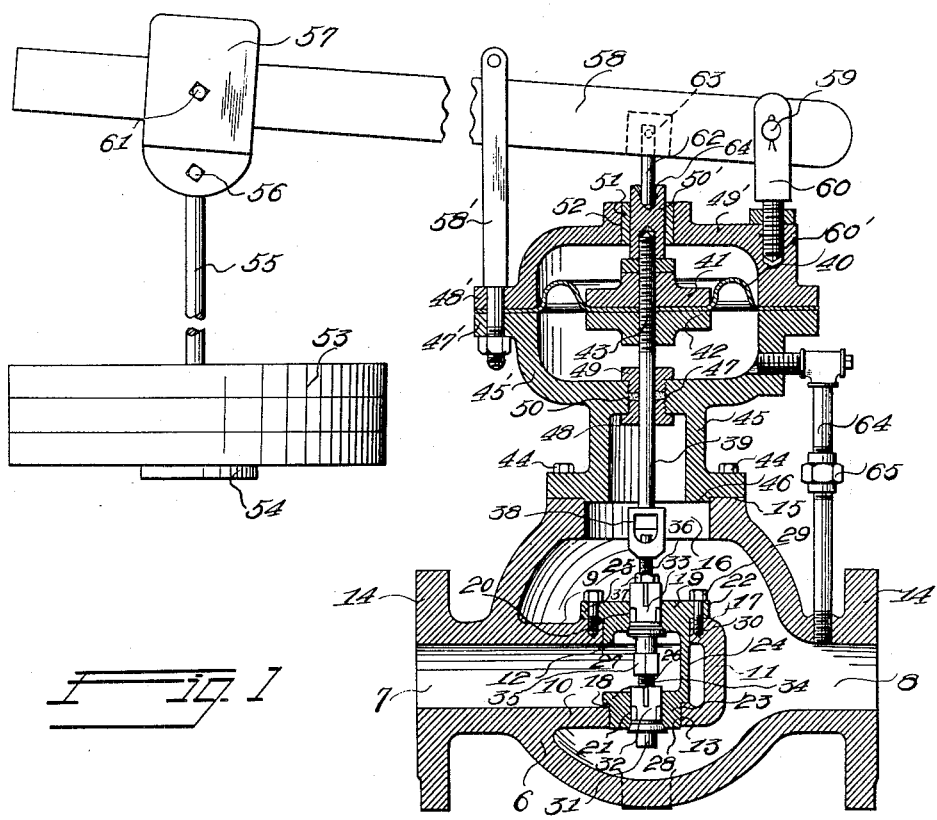
Figure 1 is a vertical sectional view of my improved regulator valve.

In the form of the invention shown in Figure 1, a regulator responsive to fluctuations in pressure at the outlet side of the valve is shown. In this figure, 6 indicates the valve body having an inlet 7 and an outlet 8. Inlet 7 is separated from outlet 8 by an open sided box like separating structure including top and bottom portions 9 and 10 and closed sides 11. Openings in axial alignment 12 and 13 are formed through portions 9 and 10 respectively.

Body 6 is provided with the usual connecting flanges 14 surrounding the inlet and outlet of the body, and a flat surface 15 at right angles to the axis of openings 12 and 13 before referred to. A further opening 16 having its axis in alignment with the axes of openings 12 and 13 is provided in the body 6. It will be observed that the diameter of openings 16, 12 and 13 are of diminishing diameters, from opening 16, to opening 13. Portions 9 and 10 are provided with annular short projections 17 and 18 surrounding openings 12 and 13 respectively. In view of the fact that the openings 16, 12 and 13 are in axial alignment but of decreasing diameters it is apparent that in manufacturing the valve body surfaces 15 and the top surfaces of projections 17 and 18, as well as the side surfaces of openings 12 and 13 may be finished with one set up of the valve body. This is a feature of importance as the production cost is thus greatly reduced, over valves including a plurality of internal surfaces that are not readily accessible for machine turning or which require that the work be shifted in the machining operations to finish variously located surfaces. It will also be observed that by applicant's arrangement extreme accuracy may be secured with respect to the relative position of the finished surfaces.

Figure 3:
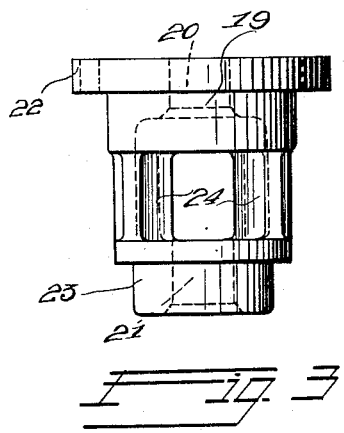
Figures 3 and 4 are elevational views of the improved valve cage.
Figure 4:
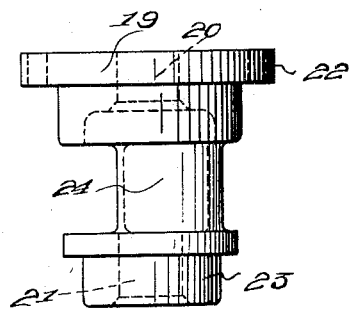

A unitary cage 19 shown in Figures 3, 4 and 5 is secured within valve body 6. Cage 19 has aligned openings 20 and 21 formed in portions 22 and 23 that are connected in spaced relation by webs 24, preferably two in number, though other spacing and connecting constructions may be used the desideratum being that a cage of skeleton form be provided so that the fluid may flow from inlet 7 between webs 24 and through openings 20 and 21 to outlet 8 when the valve, presently to be described, is open.

Portions 22 and 23 include flanges 25 and 26, designed to rest on the finished surfaces on projections 17 and 18, and annular positioning portions 27 and 28 fitting within openings 12 and 13 before referred to. The contacting surfaces may be finished to secure an accurate fit between the cage 19 and portions 9 and 10.

The cage is secured in position by stud bolts 29 engaging threaded openings 30 in portion 9. It will be observed that the maximum diameter of cage 19 is less than the diameter of opening 16 and that the heads of stud bolts 29 are readily accessible through said opening. By this arrangement the cage may be readily removed and replaced in the valve body through opening 16. As the outside diameters of the cage diminish in the direction of movement when it is replaced it is apparent that the insertion of the cage can be simply and efficiently accomplished. This is a feature of importance as servicing of the valve is thus simplified.

In a construction of the type described it is essential that there be substantially no leakage between the valve body walls 9 and 10 and the valve cage. It is for this reason that the upstanding flanges 17 and 18 are provided surrounding openings in walls 9 and 10, and these flanges are carefully machined, as previously described. The lower surfaces of flanges 25 and 26 are also of course machined to accurately fit flanges 17 and 18, and when the valve cage is inserted in position the stud bolts 29 are turned down tightly, so that the machined surfaces as above described are pressed closely into engagement. An accurate and leak-proof fit may thus be obtained, and since these parts are not subjected to wear as they are not movable as the valve opens and closes, a permanent fit is obtained.

The flow of fluid is controlled by a movable valve element 31 comprising two valves 32 and 33 having suitable seats engaging corresponding seats in openings 20 and 21. Valve 32 is provided with a threaded opening designed to receive a threaded stem 34, projecting from valve 32. A suitable wrench engaging head 35 is provided adjacent stem 34 to facilitate the adjustment of stem 34 to thereby space the valves 32 and 33 to accurately bring them to proper relative position. This adjustment can be properly made before the valve element and cage are placed in the valve body, head 35 being then accessible to effect the needed adjustment to insure accurate seating of the valves.

A threaded stem 36 is held in adjustable position by a nut 37 in a threaded bore in valve 33. Said stem is removably secured in a threaded bore in a yoke end 38 of a valve actuating rod 39, the movements of said rod being controlled by the movements of a diaphragm 40 secured between two abutments 41 and 42 adjustable on the threaded end 43 of rod 39.

Secured to the valve body 6 on surface 15 by bolts or studs 44 is a casting 45 having a locating projection 46 engaging the upper edge of the opening 16. Said casting is provided with an inwardly projecting annular flange 47 threaded on its edge to receive externally threaded sleeves 48 and 49 surrounding rod 39 and between which a gasket 50 is clamped to provide a fluid tight joint between the rod 39 and the diaphragm chamber. The diaphragm chamber is formed by providing casting 45 with a bowl shaped enlargement 45′ having a flange 47′ to which is secured a flange 48′ of an inverted bowl shaped casting 49′, the diaphragm 40 being clamped between flanges 47′ and 48′ as clearly shown in Figure 1. In order to insure movement of rod 39 with its axis coincident with the axis of openings 20 and 21 said rod has secured to its threaded upper end a guide sleeve 50′ that is free to slide in a bushing 51 provided in opening 52 in casting 49′, the axis of bushing 51 and sleeve 50′ being coincident with the axis of said openings. The movable valve element is biased toward open position by counterweights 53 supported on a disk 54 secured to a rod 55 pivoted at 56 to a sleeve 57 that is slidably adjustable along a lever 58 pivoted at 59 between the legs of a yoke 60 having a threaded stem screwed into a threaded bore 60′ in casting 49′. A set screw 61 holds the sleeve 57 in position on lever 58. Suitable lever guiding means 58′ is secured to the casing to control the movement of lever 58.

The effect of counterweights 53 is communicated to the movable valve element 31 by a projection 62 preferably pivoted in a recess 63 in lever 58, said projection having its end resting in a recess 64 in guide sleeve 50.

The pressure in the conduit, preferably at the outlet side of the valve body is applied to diaphragm 40 by connecting valve body 6 with the chamber beneath the diaphragm by a pipe 64. Preferably pipe 64 is made in sections the ends of which are threaded to receive a coupling sleeve 65, whereby the pipe sections may be readily separated when it is desired to remove casting 45 to secure access to the valve cage 19 and movable valve element 31.

Figure 2 shows the improved regulator valve mechanism applied to a flow controller designed to respond to fluctuations in differential pressure across an orifice provided in member 66 arranged in conduit 67 to which the valve body 6 is connected in any suitable manner. The construction of valve body 6, cage 19, movable valve element 31, casting 45, and valve operating rod 39 are substantially the same as in the form of the invention shown in Figure 1, and a description of these elements will not be repeated here. Diaphragm 40 is clamped for movement with rod 39 between adjustable abutments 68 and 69 threaded on the end of said rod. An annular guide sleeve 70 serves to guide the movement of rod 39 and to hold one end of a spring 71 in engagement with abutment 69. The other end of said spring engages a shoulder 72 on member 73 having a threaded stem 74 adjustable in the upper member 75 of the regulator casing. Member 75 is supported on a casting 76 that in turn is secured to casting 45. Casting 76 forms the upper diaphragm chamber and a part of the housing for spring 71 as clearly shown in Figure 2. A cap 77 protects and houses the stem 74. Suitable pipes 78 and 79 connect opposite sides of diaphragm 40 to different points adjacent the orifice in member 66 thus causing the diaphragm 40 to move in accordance with fluctuations in differential pressure between said points. The pipes 78 and 79 are made in sections with the line of division approximating the plane of surface 15, said sections being coupled together by coupling 80 engaging threaded ends of the sections. By this arrangement the regulator mechanism in castings 45, 76 and 75 may be removed as a unit without disconnecting pipes 78 and 79 at their connections to the diaphragm chamber or to the conduit adjacent the orifice.

In the modified form of valve cage shown in Figure 6 the openings 20 and 21 are enlarged and threaded and the valve seats or inserts 80 and 81 are threaded into these openings. With this construction the inserts 80 and 81 may be of different metal from the cage 19, and may be of hard or soft metal as desired, which may be renewed without renewing the main body of the cage.

The operation of the regulator will be obvious from the above description. In assembly the valve cage and parts are inserted and positioned from a single location through the top of the body. It is not necessary that the parts be accessible from any other location through the body. When it is necessary to disassemble the parts for the purpose of repair and inspection and for accurately seating the valves, the diaphragm casing is taken apart to expose the end of rod 39 located therein. This rod can then be turned to release the valve element 31. The casting 45 can then be removed. Or, if desired, the bolts 44 can first be removed, the coupling released, and the whole regulator assembly turned to unthread the valve stem 36 from yoke 38. In this way access can be had to the valve cage and the valve and they can be removed and repaired or replaced as may be desired.

The invention may be embodied in other specific forms without departing from the spirit of or essential characteristics of the invention, and the present embodiment is therefore to be considered in all respects as illustrative and not restrictive, the scope of the invention being indicated by the appended claim rather than by the foregoing description and all changes which come within the meaning and range of equivalency of the claim are therefore intended to be embraced therein.

What I claim is:

In a gas regulator valve, a valve body having an inlet and an outlet separated by a wall having two axially aligned openings, the upper opening being substantially larger than the lower opening; a valve cage fitted within said openings having upper and lower outstanding flanges for gas-tight engagement around the openings in said wall; means for securing said cage to said wall with both flanges thereof in gas-tight engagement around said openings; upper and lower valve seats around aligned openings within said cage; a valve stem extending through the openings in said cage; two valves adjustably secured to said stem for engaging said valve seats, one valve being within said cage; the upper portion of said valve cage being connected to the lower portion thereof by two webs unequally spaced peripherally of said cage; the upper wall of said valve body having an opening larger than the outstanding flanges on said cage whereby said cage and valves may be inserted and removed through said opening and the upper and lower portions of said wall defining the two openings therein may both be machined through the upper opening in the valve body; a regulator casing having a diaphragm and a rod operable thereby secured over the opening in said valve body; and means for detachably connecting said diaphragm rod and said valve stem.

In testimony whereof I affix my signature.

ALLEN D. MacLEAN.